Patented Sept. 19, 1939

2,173,383

UNITED STATES PATENT OFFICE 2,173,383

COPPER XANTHATE

Roscoe H. Carter, Washington, D. C., dedicated to the free use of the People of the United States of America No Drawing. Application August 16, 1937,
Serial No. 159,325

3 Claims. (Cl. 260—438)
(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States for governmental purposes without the payment to me of any royalty thereon.

I hereby dedicate the invention herein described to the free use of the people of the United States of America to take effect on the granting of a patent to me.

The object of my invention is to provide new and useful copper xanthates of the mono alkyl ethers of ethylene glycol.

They may be prepared according to the reaction—

$$ROCH_2CH_2OH + CS_2 + KOH \rightarrow ROCH_2CH_2OCS_2K + H_2O$$

wherein R represents an organic radicle such as methyl, ethyl, propyl, butyl, amyl and others of the alcohol series having the formula $C_nH_{2n+2}O$. Strong alkalies, other than potassium hydroxide may be used in this reaction.

The alcohols used for the preparation of the ethers of ethylene glycol may be normal or branched chain compounds.

The following examples illustrate the preparation of typical members of the xanthate series described herein.

1. Xanthates of the mono ethyl ether of ethylene glycol.

Twenty-five grams of the mono ethyl ether of ethylene glycol and 15.5 grams of potassium hydroxide were heated to boiling under a reflux condenser. This mixture was then cooled to room temperature and to it was added 21 grams of carbon disulfide and it was again heated to boiling under a reflux condenser. After cooling the mixture solidified to a yellowish mass which was evidently the potassium xanthate of the mono ethyl ether of ethylene glycol. It was dissolved in water and added to a solution of 50 grams of $CuSO_4.5H_2O$ in 1½ L. of water. A bright yellow precipitate formed which was filtered off, washed twice with water and twice with acetone and then dried in air. This material was then found by analysis to have a copper content agreeing closely with that required theoretically for $CuS_2COCH_2CH_2OC_2H_5$.

2. Xanthates of the mono methyl ether of ethylene glycol.

Twenty grams of the mono methyl ether of ethylene glycol and 14 grams of potassium hydroxide and 20 grams of carbon disulfide were mixed and allowed to stand at room temperature for two days. A reaction took place forming the potassium xanthate of the mono methyl ether of ethylene glycol. This compound was then dissolved in water and poured into a solution of 33 grams of $CuSO_4.5H_2O$ in 1½ L. of water. A bright yellow precipitate was formed which was filtered off, washed twice with water and twice with acetone, and dried in air at room temperature. It was found by analysis to have a copper content agreeing closely with the theoretical copper content of $CuS_2COCH_2CH_2OCH_3$.

It is evident from these reactions that alkali metal xanthates can be formed from the mono alkyl ethers of ethylene glycol when molecularly equivalent amounts of an alkali metal hydroxide, carbon disulfide, and the mono alkyl ether are allowed to react together. These compounds in the case of the potassium salts are soluble in water and possess characteristics similar to the xanthates of the alcohols. They combine with copper in the characteristic reaction of xanthates according to the equation

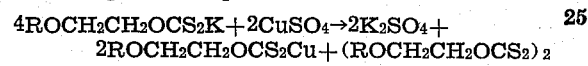

$$4ROCH_2CH_2OCS_2K + 2CuSO_4 \rightarrow 2K_2SO_4 + 2ROCH_2CH_2OCS_2Cu + (ROCH_2CH_2OCS_2)_2$$

The copper salts are characteristic yellow finely divided powders insoluble in water. The dixanthogens are oily viscous liquids insoluble in water but soluble in organic solvents. These compounds may find a number of useful applications especially as insecticides and fungicides. It is recognized that the xanthates of some of the alcohols possess insecticidal value but most of them have disagreeable and unpleasant odors. I have found that the xanthates of the mono alkyl ethers of ethylene glycol for the most part do not have these disagreeable and unpleasant odors and therefore represent a distinct improvement over the former class of compounds. In addition they retain to a certain extent their ethereal properties which should increase their effectiveness.

Having thus described my invention, what I claim for Letters Patent is:

I claim:

1. A cuprous xanthate of a lower alkyl ether of ethylene glycol.

2. The copper xanthate of the mono methyl ether of ethylene glycol.

3. The copper xanthate of the mono ethyl ether of ethylene glycol.

ROSCOE H. CARTER.